US010062310B2

(12) United States Patent
Ilgin et al.

(10) Patent No.: US 10,062,310 B2
(45) Date of Patent: Aug. 28, 2018

(54) HOUSEHOLD APPLIANCE COMPRISING A LOGO AND A LOGO COATING METHOD

(71) Applicant: ARCELIK ANONIM SIRKETI, Istanbul (TR)

(72) Inventors: Soner Ilgin, Istanbul (TR); Serdal Korkut Avci, Istanbul (TR); Alper Batur, Istanbul (TR); Umit Gulbay, Istanbul (TR)

(73) Assignee: ARCELIK ANONIM SIRKETI, Istanbul (TR)

( * ) Notice: Subject to any disclaimer, the term of this patent is extended or adjusted under 35 U.S.C. 154(b) by 237 days.

(21) Appl. No.: 14/391,004

(22) PCT Filed: Mar. 29, 2013

(86) PCT No.: PCT/EP2013/056838
§ 371 (c)(1),
(2) Date: Oct. 6, 2014

(87) PCT Pub. No.: WO2013/149973
PCT Pub. Date: Oct. 10, 2013

(65) Prior Publication Data
US 2015/0068087 A1 Mar. 12, 2015

(30) Foreign Application Priority Data
Apr. 5, 2012 (TR) ................................ 2012/03934

(51) Int. Cl.
*B60C 13/02* (2006.01)
*G09F 19/00* (2006.01)
(Continued)

(52) U.S. Cl.
CPC ................ *G09F 23/00* (2013.01); *G09F 3/00* (2013.01); *G09F 7/16* (2013.01); *G09F 23/0058* (2013.01)

(58) Field of Classification Search
CPC ......... B29C 2037/80; G09F 3/10; G09F 7/12; G09F 3/02; G09F 7/12; B44C 1/105; B60C 13/001; Y10T 156/1085
(Continued)

(56) References Cited

U.S. PATENT DOCUMENTS 1,899,533 A * 2/1933 Spencer .................. C25D 5/54 205/120
3,226,865 A * 1/1966 Brand ..................... G09F 13/06 40/615
(Continued)

FOREIGN PATENT DOCUMENTS

CN 2852292 Y 12/2006
CN 101404128 A 4/2009
(Continued)

OTHER PUBLICATIONS

International search report and written opinion, dated Jul. 19, 2013, of International Application No. PCT/EP2013/056838; 10 pgs.

*Primary Examiner* — Shin H Kim
(74) *Attorney, Agent, or Firm* — Kilpatrick Townsend & Stockton LLP

(57) ABSTRACT

What is described is a dishwasher (1) comprising a body (2), at least one rack (3) placed into the body (2), having a base and side walls (4) surrounding the base and wherein the objects to be washed are placed, at least one shelf (7), mounted to the side walls (4) of the rack (3), having a carrying surface (5) whereon kitchenware like cups, glasses etc can be placed. At least one slot (8) with both ends closed is located on the shelf (7) and an auxiliary element (10) having at least one pin (9) that can both rotate and slide inside the slot (8) is folded over the carrying surface (5) by being rotated around the pin (9) when the pin (9) is rested against any end of the slot (8).

13 Claims, 4 Drawing Sheets

Figure 1:
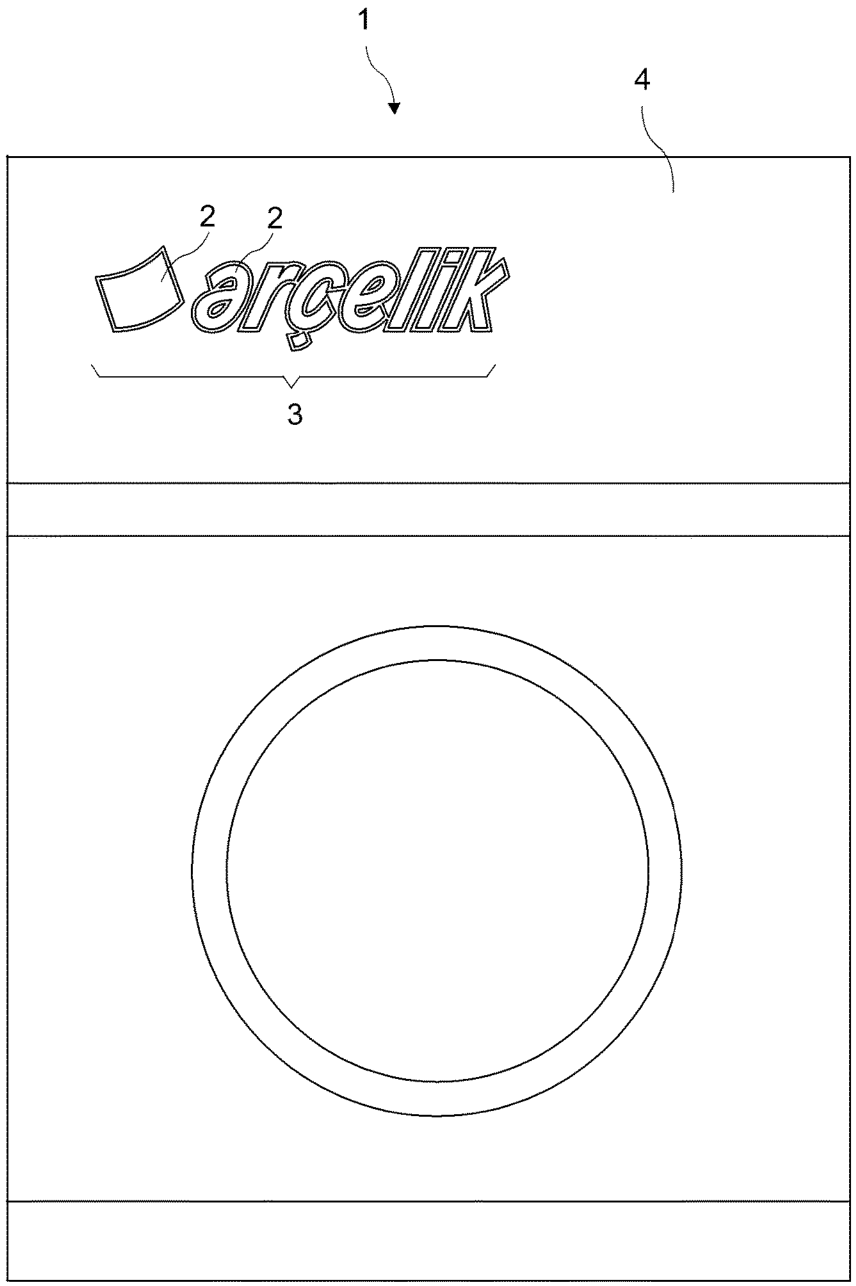

(51) Int. Cl.
*G09F 23/00* (2006.01)
*G09F 7/16* (2006.01)
*G09F 3/00* (2006.01)

(58) Field of Classification Search
USPC .................................................... 40/615, 638
See application file for complete search history.

(56) References Cited

U.S. PATENT DOCUMENTS 3,578,538 A * 5/1971 Prosser et al. ......... H02B 15/00 156/253
3,786,584 A * 1/1974 Holson .................. A47G 1/065 40/124
3,930,924 A * 1/1976 Oka ..................... G06K 19/083 156/268
4,077,146 A * 3/1978 Nasgowitz .............. G09F 13/08 40/540
4,835,890 A * 6/1989 Nelson ...................... G09F 7/16 40/616
4,900,604 A * 2/1990 Martinez ................. B44C 1/105 156/63
4,906,316 A 3/1990 Seidl
5,240,539 A * 8/1993 Gunzelman ............. B44C 1/162 156/247
5,300,164 A * 4/1994 DeTrano ................. B29C 66/71 152/524
5,371,136 A * 12/1994 Brooks ................ C09D 121/02 427/393.5
5,414,947 A * 5/1995 Hjaltason ................ G09F 13/20 40/584
5,464,681 A * 11/1995 Luce ......................... G09F 3/02 40/594
5,536,558 A * 7/1996 Shelton ................... G09F 13/20 156/209
5,564,210 A * 10/1996 Hetzer .................... G09F 3/204 40/5
5,628,132 A * 5/1997 Marshall ................... B65C 7/00 40/322
5,636,385 A * 6/1997 Harrison ................ A41D 27/08 2/115
5,884,422 A * 3/1999 Marshall ............ A47G 25/1421 40/322
6,053,228 A * 4/2000 Baker ..................... B60C 13/02 152/523
6,387,485 B1 * 5/2002 Bielek ..................... B43L 1/008 428/208
6,477,799 B1 * 11/2002 Erickson ................. G09F 19/02 40/406
6,482,288 B1 * 11/2002 Kreckel ................... A47G 1/17 156/247
6,491,781 B1 * 12/2002 Kreckel ................... A47G 1/17 156/247
6,531,021 B1 * 3/2003 Loncar, Jr. ............... A47G 1/17 156/247
6,694,652 B1 * 2/2004 Jeha ..................... G09B 21/003 40/615
6,760,986 B1 * 7/2004 MacNeil ................. G09F 7/002 277/641
7,090,907 B2 * 8/2006 Fearn ........................ G09F 3/02 156/250
7,290,482 B2 * 11/2007 Pan ..................... A47J 37/0892 219/521
7,387,144 B2 * 6/2008 Byrne .................... B29D 30/72 152/523
7,412,790 B2 * 8/2008 Riopel ................... G02B 6/005 40/542
D601,489 S * 10/2009 Lundgren .................... D12/605
7,770,801 B1 8/2010 Bailey
8,510,978 B2 * 8/2013 Chen ................ G06K 19/07758 24/104
8,627,586 B2 * 1/2014 Bozio .................... B60Q 3/044 40/580
8,851,584 B2 * 10/2014 Seo ....................... F25D 23/028 312/204
2002/0095839 A1 * 7/2002 Allen, Jr. ............... G09B 21/00 40/584
2003/0150148 A1 * 8/2003 Spear ........................ G09F 3/10 40/638
2003/0184894 A1 10/2003 Bischof et al.
2004/0083769 A1 * 5/2004 Kim ........................ D06F 37/28 68/12.02
2004/0103974 A1 * 6/2004 Majumdar ................ G09F 3/04 156/110.1
2004/0111941 A1 * 6/2004 Spear ........................ G09F 3/10 40/638
2005/0073068 A1 4/2005 Kearney et al.
2006/0191617 A1 * 8/2006 Byrne .................... B29D 30/72 152/524
2007/0273147 A1 * 11/2007 Phillips .................. D21H 21/42 283/94
2008/0163759 A1 * 7/2008 Meiry ..................... G07F 17/32 99/357
2009/0116248 A1 5/2009 Peng et al.
2009/0260749 A1 10/2009 Ankamafio-Adejei
2010/0154261 A1 * 6/2010 Bozlo .................... B60Q 3/044 40/541
2010/0236119 A1 * 9/2010 Pellei ........................ G09F 3/14 40/638
2010/0275481 A1 * 11/2010 Oriel ......................... G09F 3/10 40/606.03
2011/0253412 A1 10/2011 Shin et al.
2013/0125436 A1 * 5/2013 Vallar .................. A47G 1/0622 40/714
2014/0239010 A1 * 8/2014 Hwang ................. F25D 23/126 222/23
2014/0283425 A1 * 9/2014 Vallar ...................... A47G 1/06 40/745
2015/0068087 A1 * 3/2015 Ilgin ....................... G09F 23/00 40/675

FOREIGN PATENT DOCUMENTS

| | | | |
|---|---|---|---|
| DE | 4434331 | C1 | 12/1995 |
| DE | 10141634 | A1 | 3/2003 |
| DE | 102004061890 | A1 | 7/2006 |
| DE | 102006053906 | A1 | 5/2008 |
| EP | 1342589 | A1 | 9/2003 |
| JP | S6280283 | A | 4/1987 |
| JP | 2003312428 | A | 11/2003 |
| JP | 2004198775 | A | 7/2004 |
| JP | 2004209818 | A | 7/2004 |
| JP | 2007313660 | A | 12/2007 |
| KR | 20090048263 | A | 5/2009 |
| TW | 201006582 | A | 2/2010 |
| WO | 2004114342 | A1 | 12/2004 |

* cited by examiner

HOUSEHOLD APPLIANCE COMPRISING A LOGO AND A LOGO COATING METHOD

The present invention relates to a household appliance comprising a logo composed of characters, figures or symbols such as letters, numerals, and to a logo coating method.

On the front panel or the control panel, the cover or the front surfaces facing the user located on the body of the household appliances, logos are generally present, composed of various figures or symbols and/or characters such as letters, numerals that enable the user to read the brand or the model of the household appliance. Embodiments are known wherein spatial or in other words 3D logos in relief form are applied on the household appliance in order for them to be seen in low light conditions and from different angles. In known embodiments, logos in relief form are formed on the household appliance by means of metal or plastic molds or surface finishing tools. Logos in relief form protrude from the surface of the household appliance, sharp edges of characters or symbols forming the logo tear cleaning means such as fabric, sponge, etc., and the user may hurt himself/herself by his/her hand hitting the sharp edges of the logo. Recessed logos are also widely used, that do not protrude or protrude a little from the surfaces of the household appliances. In the recessed logo embodiment, segments of the logo, such as characters or symbols are adhered into the recesses form on the household appliance surface. Logo segments adhered into the recesses come loose and fall in course of time or may stand out from the surface and cause nonaesthetic appearance.

In the Taiwan Patent Application No. TW 201006582, a metallic logo is disclosed, that is shaped by means of punching process.

The aim of the present invention is the realization of a household appliance comprising a logo that is enabled to be perceived in 3D by the user and that is prevented from coming loose in the course of time.

The household appliance realized in order to attain the aim of the present invention, explicated in the first claim and the respective claims thereof comprises a logo situated on the body thereof and composed of logo segments such as letter, character, symbol. The logo segments are coated onto platforms formed on the logo background, and there are grooves between the logo and the platforms, that separate the logo and the background surface from each other. The grooves are cut into the background along the outline of each logo segment forming the logo by means of known shaping methods.

The logo is fixed onto a background visible to the user on the body of the household appliance or on the outside or the inside of the body, preferably onto the front wall, the door, the control panel or the buttons used for controlling purposes, of the household appliance.

In an embodiment of the present invention, the logo segments are produced from folio, for example metallic folio such as aluminum, chrome, etc. and coated over the upper surface of the platforms by means of the hot stamping method. During hot stamping, the grooves are not coated with folio.

In another embodiment of the present invention, the platform whereon the logo segments are coated is at the same level with the background and provides convenience during the roll-on hot stamping process.

In another embodiment of the present invention, the platform whereon the logo segments are coated is at a lower level than the background.

In another embodiment of the present invention, the platform whereon the logo segments are coated is at an upper level than the background.

In another embodiment of the present invention, the edges of the platform whereon the logo segments are coated are rounded and the logo segments and/or the folio layer covered underneath the logo segments are rendered over the rounded edges of the platform during hot stamping, thus preventing formation of sharp edges.

In the household appliance, the grooves with a certain depth and width on the logo background separate the platforms whereon the logo segments are coated and the background surface from each other, the logo segments are produced from folio, and the logo segments are perceived by the user as if they are 3D although they are not 3D, in other words not "thick". In the embodiment of the present invention, problems are eliminated, that are encountered in the logo fixing technique known as the recessed logo application and wherein the 3D, "thick" logo segments are adhered, for example not-well-adhesion, falling or standing out of the logo segments. The logo does not form any protrusions and sharp edges on the background surface, thus providing ease of cleaning.

The household appliance and the logo coating method realized in order to attain the aim of the present invention are illustrated in the attached figures, where:

FIG. 1—is the schematic view of a household appliance with the logo thereon.

Figure 2:
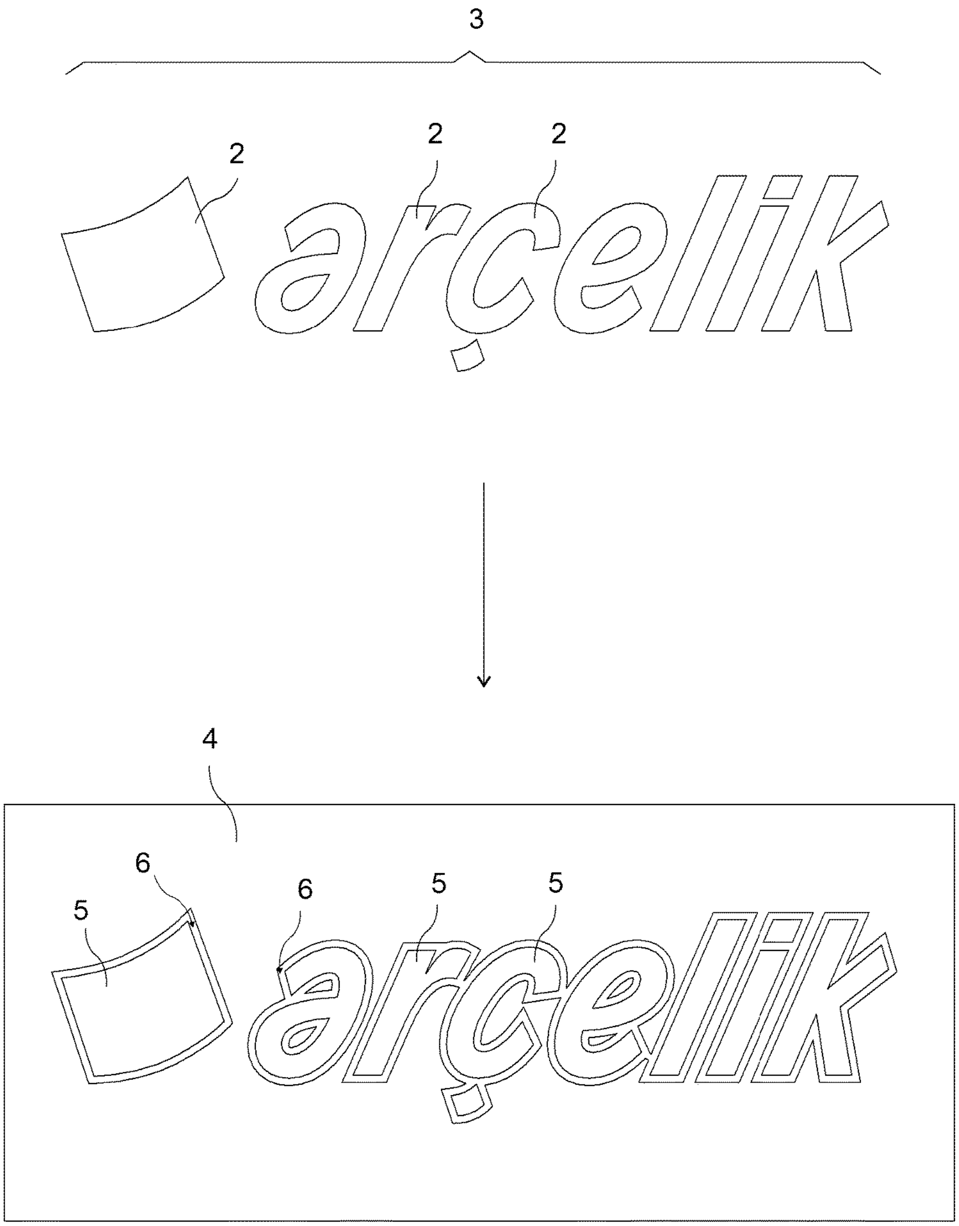

FIG. 2—is the schematic view of a logo and the background whereon the logo is coated.

Figure 3:
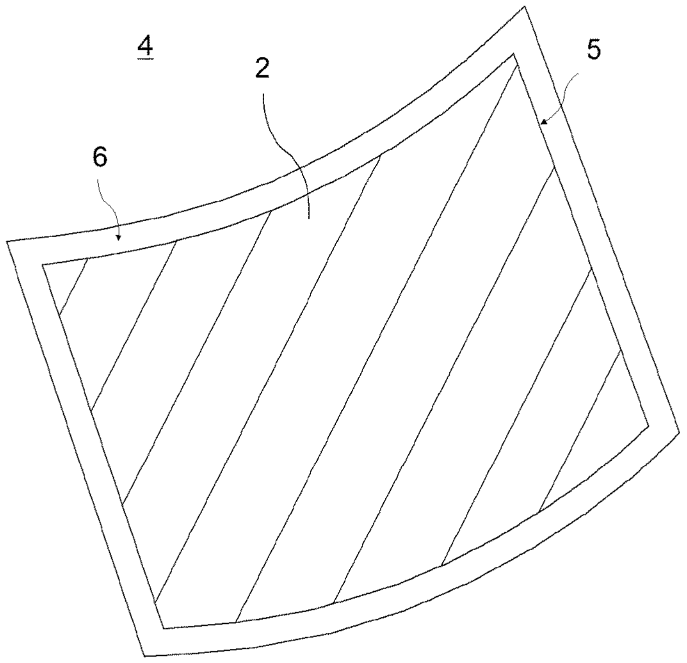

FIG. 3—is the schematic view of a logo segment and the grooves therearound.

Figure 4:
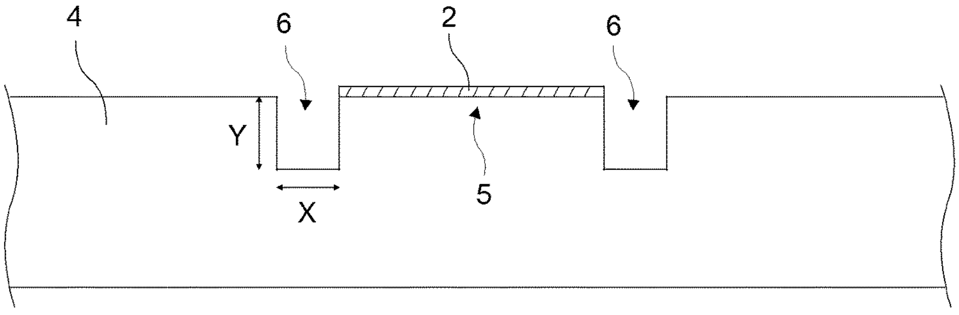

FIG. 4—is the schematic view of the platform, the logo segment and the grooves situated on a background in the household appliance.

Figure 5:
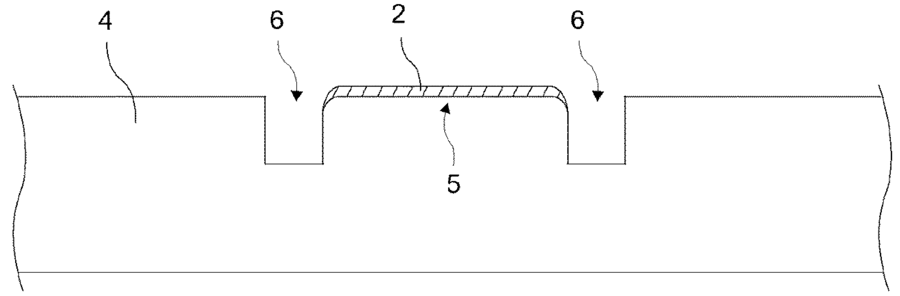

FIG. 5—is the schematic view of the platform, the logo segment and the grooves situated on a background in the household appliance in another embodiment of the present invention.

Figure 6:
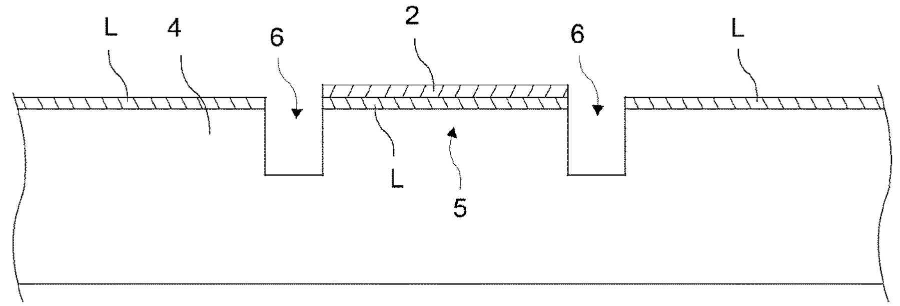

FIG. 6—is the schematic view of the platform, the folio layer, the logo segment and the grooves situated on a background in the household appliance.

Figure 7:
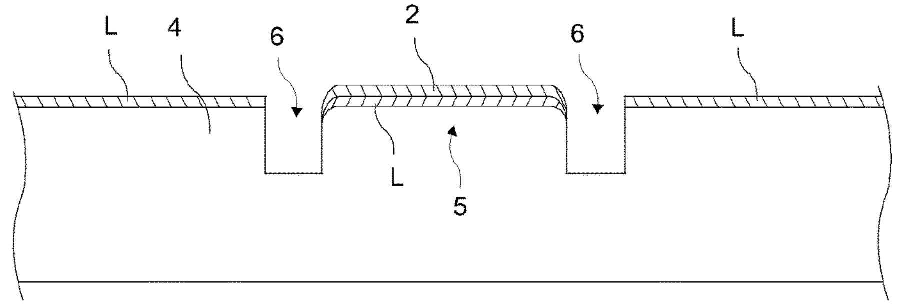

FIG. 7—is the schematic view of the platform, the folio layer, the logo segment and the grooves situated on a background in the household appliance in another embodiment of the present invention.

The elements illustrated in the figures are numbered as follows:

1. Household appliance
2. Logo segment
3. Logo
4. Background
5. Platform
6. Groove The household appliance (1) comprises a body, a logo (3) comprising one or more than one logo segment (2) like characters such as letter, numeral, etc. and/or figures, symbols providing visual presentation of the producer name, the brand, the model or a characteristic of the household appliance (1) to the user, and a background (4) whereon the logo (3) is situated.

The household appliance (1) of the present invention comprises one or more than one platform (5) in the same form as the logo segments (2), that are situated on the background (4) and whereon the logo segments (2) are at least partially coated, and one or more than one groove (6) that are situated between the background (4) and the platform (5).

The grooves (6) are cut onto the background (4) along the outline of each logo segment (2) forming the logo (3) by means of mold or surface shaping tools.

In the household appliance (1) of the present invention, first the grooves (6) along the outline of the logo segments (2) and the platforms (5) surrounded by the grooves (6) are formed on the background (4), and the logo segments (2) are coated onto the surfaces of the platforms (5). The grooves (6) extend between the surface of the background (4) and the upper surfaces of the platforms (5) and thus form the outlines of the logo segments (2) coated onto each platform (5) or the platforms (5). The grooves (6) provide the perception of the logo (3) on the background (4) in a 3D (spatial) manner, thus the legibility of the logo (3) and the aesthetic appearance are improved.

In an embodiment of the present invention, the background (4) whereon the logo (3) is placed is situated on any surface visible to the user, outside or inside the body of the household appliance (1).

In another embodiment of the present invention, the background (4) whereon the logo (3) is placed is situated on the buttons used for controlling and/or adjustment purposes, located on the household appliance (1).

In another embodiment of the present invention, the household appliance (1) is a major appliance such as refrigerator, washing machine, dishwasher, laundry dryer or oven. The logo (3) is preferably placed onto the front wall or front panel or door of the household appliance (1) (FIG. 1).

The logo (3) can be placed, apart from the parts of the household appliance (1) mentioned in the previous paragraph, for example on the detergent dispenser lid or the laundry loading lid in the washing machines, on the main rack or the cutlery basket in the dishwashers, on the door or the body shelves in the refrigerators, or on the cooking tray in the ovens.

In another embodiment of the present invention, the household appliance (1) is a kitchen apparatus (1) such as, kettle, coffee machine, toaster, mixer, blender, etc.

In another embodiment of the present invention, the household appliance (1) is an electronic device such as television, radio, DVD player, computer, etc. The logo (3) is placed on the display frame for example in the televisions or the computers.

In an embodiment of the present invention, the logo (3) is produced from folio suitable to be coated onto the platform (5), for example from metallic folio such as chrome, aluminum or like, and the logo segments (2) are simultaneously or separately coated on the platforms (5) by means of the hot stamping method. The logo segments (2) produced from folio are coated as a thin layer onto the platforms (5) surrounded by the grooves (6) and the spatial logo (3) appearance in relief form is obtained on the background (4). Although the logo segments (2) are produced from folio and "very thin" (for example 10-100 microns), the logo (3) is perceived as 3D.

In an embodiment of the present invention, the logo (3) coating method onto the household appliance (1) comprises following steps:

Forming the platforms (5) that define the outlines of the logo segments (2) by cutting the grooves (6) on the background (4) (100), Coating the logo segments (2) produced from folio by means of the up-down hot stamping method onto the platforms (5) (200).

The background (4) wherein the logo segment (2) is coated onto the platform (5) by means of the method explained above is shown in FIG. 4 and FIG. 5.

In another embodiment of the present invention, the logo (3) coating method onto the household appliance (1) comprises following steps:

Forming the platforms (5) that define the outline of the logo (3) by cutting the grooves (6) on the background (4) (100), Coating the folio layer (L) by means of the roll-on hot stamping method onto the background (4) and the platforms (5) (150), Coating the logo segments (2) produced from folio by means of the up-down hot stamping method onto the platforms (5) (200).

The background (4) whereon the folio layer (L) is coated and the platform (5) whereon the logo segment (2) is coated by means of the method explained above is shown in FIG. 6 and FIG. 7.

The logo segments (2) produced from folio and coated onto the platforms (5) can be selected in the same color as the folio layer (L) coated onto the background (4) or in different color from the folio layer (L), thus logo (3) alternatives in various visual appearances can be obtained.

In the hot stamping embodiment, the inner surfaces of the groove (6) are not coated with folio. The groove (6) has the width (X) and the depth (Y) that prevent the folio from being coated therein during the hot stamping. While coating folio onto the background (4) and/or the platforms (5), the edges of the groove (6) cut the portions of the folio that are over the groove (6), thus during the hot stamping process, the inside of the groove (6) is not coated with folio, only the background (4) and the platform (5) at both sides of the groove (6) are coated with folio. The background (4) and the platform (5) surfaces that are coated with folio are separated from each other by means of the hollow groove (6).

In an embodiment of the present invention, the platform (5) surface and the background (4) surface are coplanar. In this embodiment, since there is no level difference between the background (4) and the platforms (5), convenience is provided especially in the roll-on hot stamping process.

In another embodiment of the present invention, the level of the platform (5) surface is lower than the level of the background (4) surface.

In another embodiment of the present invention, the level of the platform (5) surface is higher than the level of the background (4) surface.

In another embodiment of the present invention, the edges of the platforms (5) are rounded. In this embodiment, the logo segments (2) applied onto the platforms (5) or the folio layer (L) coated underneath the logo segments (2) are coated (rendered) onto the edges of the platform (5), thus preventing the forming of sharp edges in the logo segments (2) (FIG. 6, FIG. 7).

In the household appliance (1), the grooves (6) formed between the logo segments (2) forming the logo (3) and the background (4) whereon the logo (3) is coated, and the "thin" logo segments (2) produced from folio and coated onto the platforms (5) surrounded by the grooves (6) by means of the hot stamping method, enable the user to perceive the logo (3) as 3D (spatial). The logo (3) does not form any protrusions and sharp edges on the background (4), thus providing ease of cleaning. Moreover, in the embodiment of the present invention problems encountered in the state of the art recessed logo embodiment such as not-well-adhesion or coming loose of the logo segments are eliminated.

It is to be understood that the present invention is not limited by the embodiments disclosed above and a person skilled in the art can easily introduce different embodiments. These should be considered within the scope of the protection disclosed by the claims of the present invention.

The invention claimed is:

1. A household appliance (1) comprising a body, a logo (3) comprising at least one logo segment (2), and a background (4) which is a visible surface of the body whereon the logo (3) is situated, characterized in that one or more than one platform (5) in the same form as the logo segments (2), that is situated on the background (4) and whereon the logo segments (2) are at least partially coated, and one or more than one groove (6) that is situated between the background (4) and the platform (5).

2. The household appliance (1) as in claim 1, characterized in that the groove (6) that is cut onto the background (4) along the outline of each logo segment (2) forming the logo (3).

3. The household appliance (1) as in claim 1, characterized in that the background (4) that is situated on any surface visible to the user outside or inside the household appliance (1).

4. The household appliance (1) as in claim 1, characterized in that the background (4) that is situated on the buttons used for controlling and/or adjustment purposes.

5. The household appliance (1) as in claim 1, which is a major appliance such as refrigerator, washing machine, dishwasher, laundry dryer or oven.

6. The household appliance (1) as in claim 1, which is a kitchen apparatus as selected from the group consisting of a kettle, a coffee machine, a toaster, a mixer, and a blender.

7. The household appliance (1) as in claim 1, which is an electronic device as selected from the group consisting of a television, a radio, a DVD player, and a computer.

8. The household appliance (1) as in claim 1, characterized in that the platform (5) and the background (4) the surfaces of which are coplanar.

9. The household appliance (1) as in claim 1, characterized in that the platform (5), the level of the surface of which is below the level of the surface of the background (4).

10. The household appliance (1) as in claim 1, characterized in that the platform (5), the level of the surface of which is above the level of the surface of the background (4).

11. The household appliance (1) as in claim 1, characterized in that the platform (5) the edges of which are rounded.

12. The household appliance (1) as in claim 1, characterized in that the logo (3) that is produced from folio suitable to be coated onto the platform (5) and of which the logo segments (2) are coated onto the platforms (5) by means of hot stamping.

13. The household appliance (1) as in claim 12, characterized in that the groove (6) that has the width (X) and the depth (Y) that prevent the folio from being coated therein during the hot stamping.

* * * * *